(12) United States Patent
Andreas-Schott et al.

(10) Patent No.: US 8,029,939 B2
(45) Date of Patent: Oct. 4, 2011

(54) FUEL CELL EJECTOR WITH INTEGRATED CHECK VALVE

(75) Inventors: Benno Andreas-Schott, Pittsford, NY (US); Ralf Senner, Pittsford, NY (US); Ian R. Jermy, LeRoy, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1115 days.

(21) Appl. No.: 11/626,888

(22) Filed: Jan. 25, 2007

(65) Prior Publication Data

US 2010/0255399 A1 Oct. 7, 2010

(51) Int. Cl.
*H01M 8/24* (2006.01)
*F16K 15/00* (2006.01)
*F16K 15/03* (2006.01)
*B05B 1/30* (2006.01)

(52) U.S. Cl. ......... 429/454; 137/511; 137/527; 239/569

(58) Field of Classification Search .................. 429/454
See application file for complete search history.

(56) References Cited

U.S. PATENT DOCUMENTS

| | | | | |
|---|---|---|---|---|
| 3,208,394 | A | * | 9/1965 | Taplin .............................. 92/48 |
| 4,249,567 | A | * | 2/1981 | Weiss .......................... 137/512 |
| 5,328,094 | A | * | 7/1994 | Goetzke et al. ................. 239/88 |
| 5,802,848 | A | | 9/1998 | McClendon et al. |
| 6,800,390 | B2 | | 10/2004 | Kashiwagi |
| 2002/0109401 | A1 | * | 8/2002 | Ikeda et al. ................. 303/114.3 |
| 2005/0064255 | A1 | * | 3/2005 | Blaszczyk et al. ............. 429/19 |
| 2006/0024548 | A1 | | 2/2006 | Pechtold et al. |
| 2009/0155641 | A1 | * | 6/2009 | Senner et al. .................... 429/17 |

* cited by examiner

*Primary Examiner* — Patrick Ryan
*Assistant Examiner* — Brent Thomas
(74) *Attorney, Agent, or Firm* — Fraser Clemens Martin & Miller LLC; J. Douglas Miller

(57) ABSTRACT

An ejector for a fuel cell stack is disclosed, wherein the ejector includes an integrated check valve that supports hydrogen recirculation and militates against a backflow of hydrogen flowing through the ejector.

15 Claims, 4 Drawing Sheets

US 8,029,939 B2

FUEL CELL EJECTOR WITH INTEGRATED CHECK VALVE

FIELD OF THE INVENTION

The present invention relates to fuel cell stacks and more particularly to an ejector having an integrated check valve that facilitates hydrogen recirculation and militates against a backflow of hydrogen in the ejector.

BACKGROUND OF THE INVENTION

A hydrogen fuel cell is an electro-chemical device that includes an anode and a cathode with an electrolyte disposed therebetween. The anode receives a fuel such as hydrogen gas and the cathode receives an oxidant such as oxygen or air. Typically, a main hydrogen passage provides communication between a source of hydrogen and the anode. Several fuel cells are typically combined in a fuel cell stack to generate a desired amount of electrical power. A typical fuel cell stack for a vehicle may include several hundred individual cells.

Oxygen not consumed in the fuel cell stack is expelled as a cathode exhaust gas that may include water as a stack by-product. Hydrogen not consumed in the stack may be recirculated to the main hydrogen passage via a fuel recirculation passage. An amount of undesirable nitrogen is present in the unused hydrogen exiting the fuel cell. Before reintroducing the unused hydrogen back into the main hydrogen passage, a portion of the hydrogen/nitrogen mixture is exhausted into the atmosphere. This can be accomplished by a bleed valve, for example. Hydrogen and nitrogen that is not exhausted into the atmosphere through the bleed valve can be reintroduced to the main hydrogen supply via the fuel recirculation passage. The fuel recirculation passage provides fluid communication between the outlet of the fuel cell and the main hydrogen passage to allow unused hydrogen to be reintroduced to the anode. Typically, an electric pump is used to recirculate the hydrogen/nitrogen mixture back into the main hydrogen passage.

It has been a continuing challenge to provide an efficient and cost efficient method of reintroducing the unused hydrogen back into the main hydrogen passage. Space in and around the fuel cell stack is extremely limited and valued, especially in vehicular applications. Further, the electric pump used to reintroduce the unused hydrogen back into the main hydrogen passage utilizes electrical power generated by the fuel cell stack, thereby decreasing overall efficiency.

To reduce a power consumption of the electric pump, ejectors have been used in fuel cell systems to introduce fuel from the fuel source to the fuel cell stack. While ejectors have been successful at reducing the power consumption of the electric pump, there is a continuing need to further reduce the power consumption of the electric pumps.

It would be desirable to produce a fuel cell stack assembly including an ejector having an integrated check valve that supports hydrogen recirculation and militates against a backflow of hydrogen, wherein an amount of power required to facilitate the recirculation is minimized.

SUMMARY OF THE INVENTION

Harmonious with the present invention, a fuel cell stack assembly including an ejector having an integrated check valve that supports hydrogen recirculation and militates against a backflow of hydrogen, wherein an amount of power required to facilitate the recirculation is minimized, has surprisingly been discovered.

In one embodiment, a check valve assembly for a fuel cell stack comprises: a valve body having a passage formed therein, the passage having an inlet and an outlet; and a valve in communication with the passage, the valve moveable between an open and a closed position responsive to changes in pressure between the inlet and the outlet of the passage.

In another embodiment, an ejector assembly for a fuel cell stack comprises: a check valve providing selective flow of fluid between a first chamber and a second chamber; and a venturi passage formed in the check valve between the first chamber and the second chamber.

In another embodiment, an ejector assembly for use in a fuel cell stack comprises: a check valve providing selective flow of fluid between a first chamber and a second chamber; a valve disposed on an end of the check valve, an opening and a closing of the valve caused by a pressure difference between the first chamber and the second chamber; and a venturi passage formed in the check valve between the first chamber and the second chamber.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
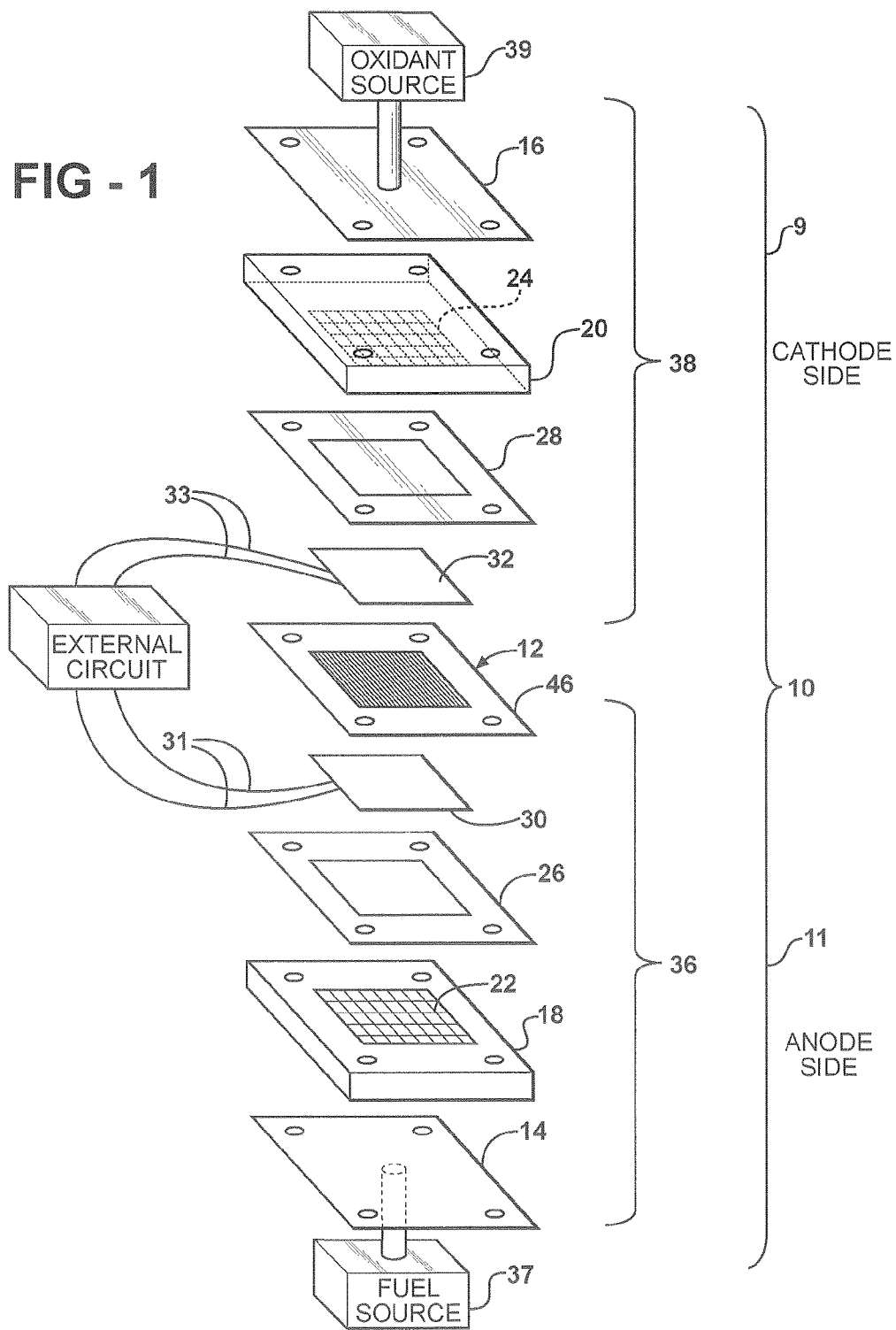
FIG. 1 is an exploded perspective view of a fuel cell system.

FIG. 1 shows a fuel cell 10 having a cathode side 9 and an anode side 11. The anode side 11, the cathode side 9, and a coolant system (not shown) are collectively referred to as a wet end of the fuel cell 10. Insulation end plates 14, 16 are referred to as a dry end of the fuel cell 10. The fuel cell 10 is in fluid communication with a fuel source 37 and an oxidant source 39. Graphite blocks 18, 20 having a plurality of openings 22, 24 to facilitate fluid distribution are disposed adjacent the insulation end plates 14, 16. Gaskets 26, 28 and carbon cloth current collectors 30, 32 having respective connections 31, 33, are respectively disposed between a membrane electrode assembly (MEA) 12 and the blocks 18, 20. An oxidant and current transport means 36 is made up of the graphite block 18, the gasket 26, and the current collector 30. A fuel and current transport means 38 is made up of the graphite block 20 the gasket 28, and the current collector 32. The anode connection 31 and the cathode connection 33 are used to interconnect the fuel cell 10 with an external circuit (not shown), and may include other fuel cells (not shown) as desired.

A fuel cell stack (not shown) is constructed of a plurality of fuel cells 10 connected in series. Once a desired number of fuel cell 10 pairs are joined together to form the fuel cell stack, the stack is provided with a coolant system (not shown). A fuel cell stack as described herein is commonly used as a power plant for the generation of electric power in a vehicle, for example.

In use, a fuel such as hydrogen, for example, is supplied from the fuel source 37 and an oxidant such as oxygen, for example, is supplied from the oxidant source 39. The fuel and oxidant from respective sources 37, 39 diffuse through respective fluid and current transport means 36, 38 to opposing sides of the MEA 12. Porous electrodes (not shown) form an anode (not shown) at the anode side 11 and a cathode (not shown) at the cathode side 9, and are separated by a Proton Exchange Membrane (PEM) 46. The PEM 46 provides for ion transport to facilitate a chemical reaction in the fuel cell 10. Typically, PEM 46 is produced from copolymers of suitable monomers. Such proton exchange membranes may be characterized by monomers of the structures:

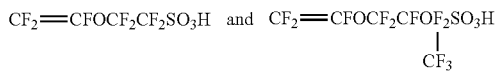

Such a monomer structure is disclosed in detail in U.S. Pat. No. 5,316,871 to Swarthirajan et al, incorporated herein by reference in its entirety.

Figure 2:
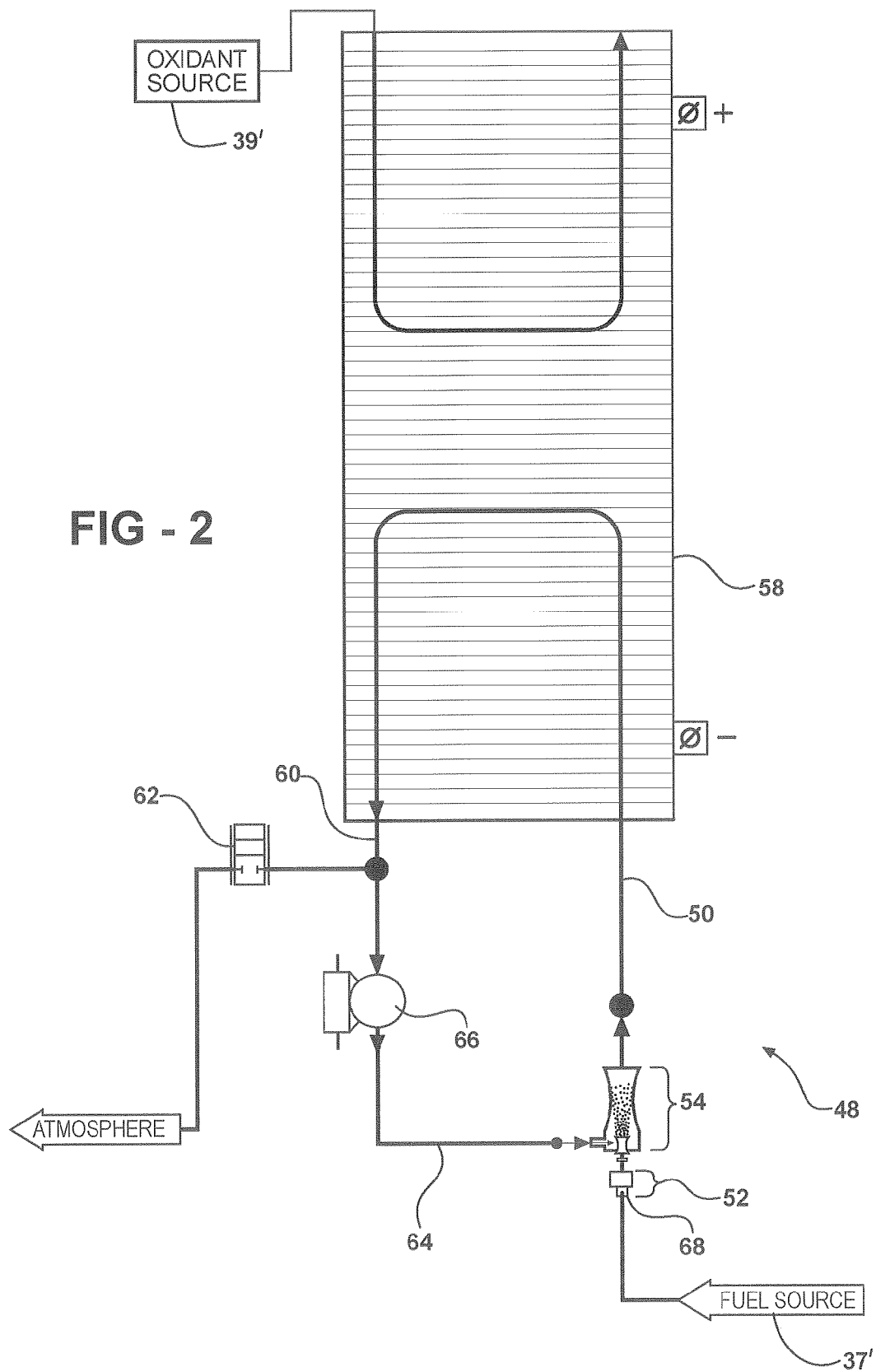
FIG. 2 is a schematic diagram of a fuel cell system in accordance with an embodiment of the invention.
Figure 3:
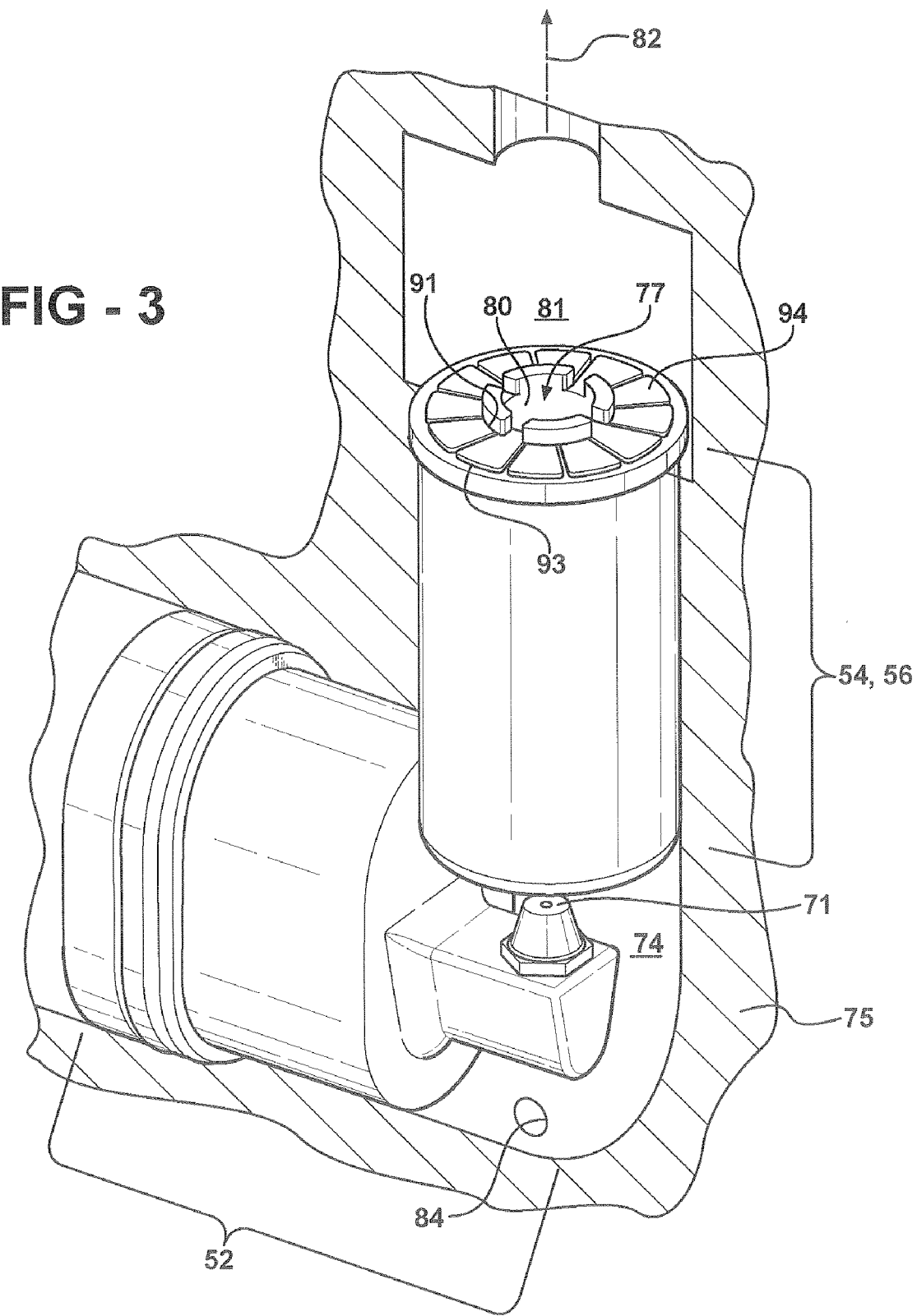
FIG. 3 is a perspective view of an injector and ejector including the check valve assembly illustrated in FIG. 2.

FIG. 2 shows a flow diagram of a fuel cell system 48 in accordance with the invention. Similar structure to that described above for FIG. 1 includes the same reference number followed by a prime (') symbol. The fuel cell system 48 includes a fuel source 37', an oxidant source 39', and a main fuel passage 50. An injector 52 and an ejector 54 are in fluid communication with the main fuel passage 50 and the fuel source 37'. The ejector 54 includes an integrated check valve assembly 56 as illustrated in FIG. 3. A fuel cell stack 58 forms at least a part of the main fuel cell passage 50 and includes one or more fuel cells (not shown) as described above for FIG. 1. The fuel cell system 48 also includes an exhaust passage 60, a bleed valve 62, a fuel recirculation passage 64, and a pump 66. The fuel cell stack 58 forms at least a part of the exhaust passage 60. The bleed valve 62 provides fluid communication between the exhaust passage 60 and the atmosphere. Fluid communication between the exhaust passage 60 and ejector 54 is provided by the fuel recirculation passage 64. Flow of fluid from the fuel cell stack 58 to the ejector 54 is caused by the electric pump 66.

Figure 4:
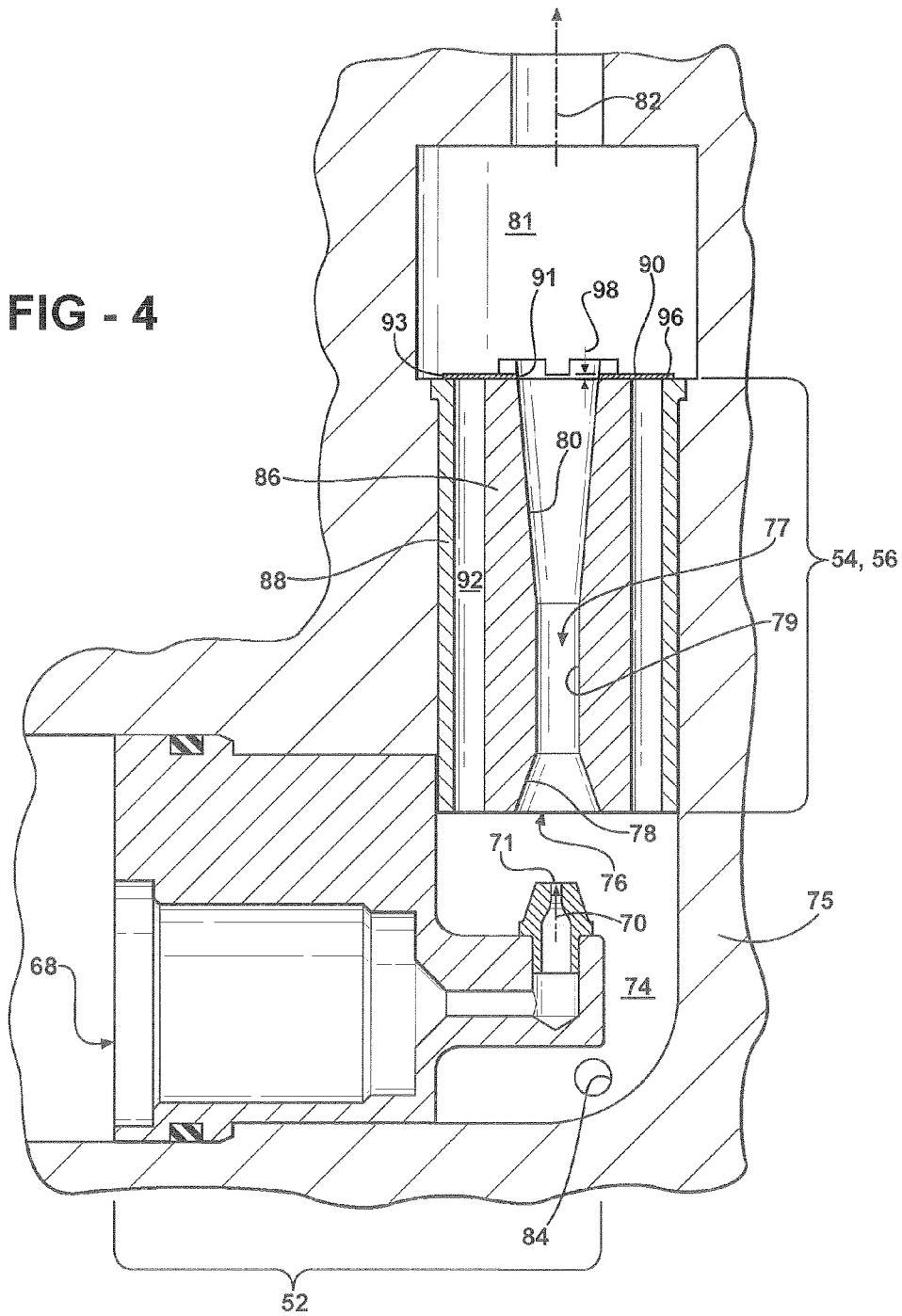
FIG. 4 is a cross sectional view of the injector and ejector including the check valve assembly illustrated in FIGS. 2 and 3.

As illustrated in FIGS. 3 and 4, the injector 52 includes a fluid inlet 68 and a spaced apart fluid outlet 70 that includes a nozzle 71. The fluid inlet 68 is in fluid communication with the fuel source 37'. The fluid outlet 70 is in fluid communication with a first chamber 74 formed in an end unit 75 of the fuel cell system 48.

The first chamber 74 is in fluid communication with an inlet 76 of the ejector 54. The ejector 54 includes a venturi passage 77 formed therein. A similar venturi passage is shown in commonly owned U.S. Pat. No. 5,802,848 incorporated herein by reference in its entirety. The venturi passage 77 includes a convergent portion 78, a throat 79, and a diffuser portion 80. The nozzle 71 of the injector 52 is substantially aligned with the throat 79 of the venturi passage 77. The venturi passage 77 provides fluid communication between the first chamber 74 and a spaced apart second chamber 81 formed in the end unit 75 of the fuel cell system 48. The second chamber 81 is in fluid communication with the diffuser portion 80 of the venturi passage 77 and an outlet 82 of the ejector 54. The outlet 82 of the ejector 54 is in fluid communication with the fuel cell stack 58 by means of the main fuel passage 50. A recirculation/ejector aperture 84 is formed in a wall of the first chamber 74. The recirculation/ejector aperture 84 facilitates fluid communication between the fuel recirculation passage 64 and the first chamber 74.

The check valve assembly 56 is integrated with the ejector 54. Alternatively, the check valve assembly 56 can be integrated with a combination injector and ejector (not shown). A combination injector and ejector is disclosed in commonly owned U.S. Pat. App. Pub. No. 2006/0024548, incorporated herein by reference in its entirety. The check valve assembly 56 includes a valve body 86 which is an integral part of the ejector 54 and surrounds the venturi passage 77. A valve housing 88 surrounds the valve body 86. In the embodiment shown, the valve body 86 is formed integrally with the valve housing 88. It is understood that the valve body 86 and the valve housing 88 can be formed separately without departing from the scope and spirit of the invention.

The valve body 86 includes a plurality of check valve passages 92 formed therein. It is understood that a desired number of check valve passages 92 as determined by a desired flow rate through the check valve passages 92 can be formed in the valve body 86. In the embodiment shown, an annular array of check valve passages 92 are formed in the valve body 86. However, other configurations of check valve passages 92 can be formed as desired. It is also understood that the check valve passages 92 can be formed in the valve housing 88 or between the valve body 86 and the valve housing 88 as desired. The check valve passages 92 provide fluid communication between the first chamber 74 and the second chamber 81.

The check valve assembly 56 also includes a flap valve 90 disposed at a downstream end of the valve body 86 and the valve housing 88, although other valve types can be used as desired. In the embodiment shown, the flap valve 90 is formed from rubber and includes a plurality of flaps or petals 94 adapted to sealingly engage corresponding check valve passages 92 formed in the valve body 86. It is understood that the flap valve 90 may be formed from other materials and in other shapes and configurations as desired, such as a flat disc, for example. An inner edge 91 of the flap valve 90 is attached to the ejector 54 by any conventional attaching means such as clamping, for example. It is also understood that an outer edge 93 of the flap valve 90 can be attached to the ejector 54, if desired. When in a closed position, the flap valve 90 sealingly engages a seating surface 96 of the valve body 86. Optionally, the seating surface 96 can be substantially concave shaped for receiving the seal 90 therein. In the embodiment shown, a recess 98 is formed in the ejector 54 secure the inner edge 91 of the flap valve 90.

In use, the fuel source 37' provides the fuel such as hydrogen to the injector 52. The fuel flows through the nozzle 71 where a velocity thereof is increased. The fuel then flows into the first chamber 74, and into the venturi passage 77. As the fuel passes through the venturi passage 77, the fuel builds pressure and a velocity thereof decreases, which creates a suction effect. Accordingly, the pressure in the second chamber 81 is higher than the pressure in the first chamber 74. This pressure difference creates a force that is exerted on the seal 90 in a direction from the second chamber 81 toward the first chamber 74, thus forcing the seal 90 against the seating surface 96 (closed position). Because of the pressure difference between the first chamber and the second chamber 81, the flow of fluid from the first chamber 74 to the second chamber 81 through the check valve passages 92 is militated against.

The flow of fluid from the second chamber 81 to the first chamber 74 through the check valve passages 92 is also militated against.

Once into the second chamber 81, the fuel exits the ejector 54 through the outlet 82. The fuel then flows to the fuel cell stack 58. Once in the fuel cell stack 58, a reaction between the oxidant from the oxidant source 39' and the fuel results in the creation of electrical energy. Fuel not consumed by the reaction is discharged through the exhaust passage 60.

Typically, an amount of nitrogen is present in the fuel during the reaction. This nitrogen flows along with the unused fuel through the exhaust passage 60. To maximize an efficiency of the fuel cell system 48, it is desirable to maintain the amount of nitrogen in the fuel cell system 48 at a predetermined level. Accordingly, if the amount of nitrogen flowing with the unused fuel is greater than a desired amount, a portion of the fuel/nitrogen mixture is exhausted into the atmosphere by means of the bleed valve 62. The remaining portion of the fuel/nitrogen mixture is caused to flow from the exhaust passage 60 to the recirculation passage by the pump 66. The pump 66 causes the nitrogen/fuel mixture to flow through the fuel recirculation passage 64 into the first chamber 74 of the ejector 54 through the recirculation/ejector aperture 84. The nitrogen/fuel mixture is then mixed in the first chamber 74 with fuel provided from the fuel source 37'. The recirculated fuel/nitrogen mixture and the fuel from the fuel source 37' are then introduced into the fuel cell stack 58 as discussed above.

In certain situations, there is a minimal amount (which may be zero) of fuel being supplied from the fuel source 37'. Such situations may include an idle engine mode, for example. In these situations, a minimal amount of fuel flows through the ejector 54. Without a predetermined amount of fuel flow through the venturi passage 77, the pressure difference between the first passage 74 and the second passage 81 is minimal, and a force exerted on the flap valve 90 is reduced. The reduced force causes the flaps 94 of the flap valve 90 to move to the open position. When the flaps 94 of the flap valve 90 are in the open position, the flow of fuel between the first chamber 74 to the second chamber 81 through the check valve passages 92 is permitted. While the flow of fuel from the first chamber 74 to the second chamber 81 is permitted, since the pressure is greater in the first chamber 74 than the pressure in the second chamber 81, the flow of fluid form the second chamber 81 to the first chamber 74 is militated against. Since flow to the second chamber 81 from the first chamber 74 is facilitated by both the venturi passage 77 and the check valve passages 92, a cumulative flow area into the second chamber 81 of the ejector 54 is maximized. Since the fuel can flow into the second chamber 81 through a larger area, an amount of fuel permitted to flow into the second chamber 81 is maximized, which results in a minimization of a flow restriction of the fuel cell system 48.

Minimizing the flow restriction of the fuel cell system 48 minimizes an amount of force required to circulate the unused fuel back to the fuel cell stack 58. Accordingly, an amount of power required for the pump 66 to recirculate the unused fuel back to the fuel cell stack 58 is minimized. Since the pump 66 requires a smaller amount of power to circulate the unused fuel back to the fuel cell stack 58, additional energy of the fuel cell system 48 is conserved, thus optimizing an efficiency of the fuel cell system 48.

Once additional fuel is required by the fuel cell stack 58, the fuel source 37' provides additional fuel to the injector 52. As described above, the pressure difference created between the first chamber 74 and the second chamber 81 causes, the flaps 94 of the flap valve 90 to move to the closed position. As a result, the flow of fuel through the check valve passages 92 into the second chamber 81 of the ejector 54 is militated against. Accordingly, upon the fuel/nitrogen mixture reaching the first chamber 54, it is mixed with the fuel from the fuel source 37' and caused to flow through the venturi passage 77 into the second chamber 81, and on to the fuel cell stack 58 as described above. Any hydrogen unused in the fuel cell stack 58 can thereafter be recirculated as discussed above.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An ejector assembly for a fuel cell stack comprising:
    a check valve assembly including at least one passage providing selective flow of fluid between a first chamber and a second chamber;
    a venturi passage formed in the check valve assembly to provide continuous flow between the first chamber and the second chamber; and
    wherein since the flow between the first chamber and the second chamber for the venturi passage is continuous and the flow of fluid between the first chamber and the second chamber for the check valve assembly is selective, both continuous flow between the first chamber and the second chamber through the venturi passage without flow through the check valve assembly and continuous flow between the first chamber and the second chamber through the venturi passage simultaneous with flow between the first chamber and the second chamber through the check valve assembly is facilitated.

2. The ejector assembly according to claim 1, wherein a valve of the check valve assembly is disposed at an end of the check valve assembly, and an opening and a closing of the valve is caused by a pressure difference between the first chamber and the second chamber.

3. The ejector assembly according to claim 2, wherein the valve is a flap type valve.

4. The ejector assembly according to claim 1, wherein the first chamber is in fluid communication with a fuel recirculation passage.

5. The ejector assembly according to claim 4, wherein the first chamber is in fluid communication with a fuel source.

6. The ejector assembly according to claim 5, wherein the second chamber is in fluid communication with the fuel cell stack.

7. An ejector assembly for a fuel cell stack comprising:
    a check valve assembly including a valve body, a valve housing, a valve, and at least one passage formed in one of the valve body, the valve housing, and between the valve body and the valve housing to provide selective flow between a first chamber and a second chamber, wherein the valve is disposed at an end of the check valve assembly and an opening and a closing of the valve is caused by a pressure difference between the first chamber and the second chamber;
    a venturi passage formed in the valve body of the check valve assembly to provide continuous flow between the first chamber and the second chamber; and
    wherein wherein since the flow between the first chamber and the second chamber for the venturi passage is continuous and the flow of fluid between the first chamber and the second chamber for the check valve assembly is selective, both continuous flow between the first chamber and the second chamber through the venturi passage without flow through the check valve assembly and continuous flow between the first chamber and the second chamber through the venturi passage simultaneous with flow between the first chamber and the second chamber through the check valve assembly is facilitated.

8. The ejector assembly according to claim 7, wherein the valve is a flap type valve.

9. The ejector assembly according to claim 8, wherein the valve includes a plurality of radially outwardly extending petals.

10. The ejector assembly according to claim 9, wherein the check valve assembly includes a plurality of concave seating surfaces for receiving the petals of the valve.

11. The ejector assembly according to claim 7, wherein the first chamber is in fluid communication with a fuel recirculation passage.

12. The ejector assembly according to claim 11, wherein the first chamber is in fluid communication with a fuel source.

13. The ejector assembly according to claim 7, wherein the second chamber is in fluid communication with the fuel cell stack.

14. The ejector assembly according to claim 7, wherein the valve body of the check valve assembly is integrally formed with the valve housing of the check valve assembly.

15. The ejector assembly according to claim 7, wherein the at least one passage formed in one of the valve body, the valve housing, and between the valve body and the valve housing of the check valve assembly is an annular array of passages formed therein to provide selective flow between the first chamber and the second chamber.

* * * * *